United States Patent [19]

Neil

[11] 3,746,497

[45] July 17, 1973

[54] APPARATUS FOR MAKING ARTICLES OF MANUFACTURE FROM A THIN FILM OF PLASTIC

[75] Inventor: Peter C. Neil, Fullerton, Calif.

[73] Assignee: Standard Oil Company, Chicago, Ill.

[22] Filed: Apr. 8, 1971

[21] Appl. No.: 132,376

[52] U.S. Cl.............................. 425/398, 425/387
[51] Int. Cl............................................ B29f 5/00
[58] Field of Search................... 425/398, 400, 387, 425/388

[56] References Cited
UNITED STATES PATENTS

| 3,551,954 | 1/1971 | Knowles | 425/388 X |
| 3,319,295 | 5/1967 | Jones-Hinton et al. | 425/388 |
| 3,509,246 | 4/1970 | Borgardt | 425/308 X |
| 3,600,753 | 8/1971 | Otto | 425/388 |

Primary Examiner—J. Spencer Overholser
Assistant Examiner—David S. Safran
Attorney—Arthur G. Gilkes, William T. McClain and John J. Connors

[57] ABSTRACT

Disclosed is an improved thermoforming process wherein the amount of plastic film forced into a mold cavity is restricted so that only the proper amount required is introduced into the cavity. The restricting step may be achieved by (1) clamping the film at the open mouth of the cavity and then forcing film into the cavity or (2) heating only those portions of the film which are needed to properly fill the cavity or (3) heating the film uniformly and then selectively cooling those portions of the film which should not be introduced into the cavity. Novel clamping apparatus is also disclosed.

1 Claim, 8 Drawing Figures

PATENTED JUL 17 1973 3,746,497

APPARATUS FOR MAKING ARTICLES OF MANUFACTURE FROM A THIN FILM OF PLASTIC

BACKGROUND

In the thermoforming process a thin film of plastic is heated to render it pliable and then positioned between the male and female sections of a mold. The sections are moved relative to each other so that the male section forces the pliable film into the cavity of the female section. Usually, air is introduced into the female cavity to push the pliable film snugly against the interior wall of the female cavity. Next, the male and female sections are disengaged and the film with the formed article therein is withdrawn from the female cavity. The formed article is separated from marginal portions of the film by a punch which, like a cookie cutter, cuts the formed article away from the marginal film.

In conventional processes, excess film is forced into the female mold cavity and it accumulates non-uniformly near the rim of this cavity. This non-uniformity of plastic is not readily noticeable; however, when the article of manufacture is later processed, it can present problems. For example, if the article of manufacture is a cup and the lip of the cup is rolled, non-uniformity of plastic near the lip creates pucker marks on the lip which detract from the appearance of the article. The accumulation of excess material also creates non-uniformity in the wall thickness of the cup. Consequently, when these cups are nested together in a stack they tend to jam together. In vending machine operations, such jamming causes shut-down of the machine.

THE INVENTION

I have now invented a novel process which prevents or substantially reduces the introduction of excess film into the female mold cavity, thus providing greater uniformity in wall thickness. Thus containers of uniform wall thickness are more easily manufactured, pucker marks are reduced, and cups can be nested closer together.

According to my process, the amount of film being forced into the cavity is restricted at the open mouth of the cavity to avoid forcing excess film into said cavity. Restricting of the film can be accomplished in several ways. For example, the film may be clamped at the open mouth of the female cavity. A pair of clamping elements can be used having a configuration similar to the configuration of the open cavity mouth, both, for example, annular if the cavity mouth is circular. One element may be a projecting annular ring circumscribing the mouth of the female cavity. The other annular element can be a ring movable into registration with the rim ring. When the plug assist is inserted into the female cavity the annular members clamp between them the film and circumscribe the proper amount of film to be introduced into the cavity. Only this material is forced into the cavity. Restricting movement of excess film into the cavity may also be achieved by heating only those portions of the film which are needed to properly fill the cavity. Or, restricting may be achieved by heating the film uniformly and then selectively cooling those portions of the film which should not be forced into the cavity. My process has its greatest applicability when the article being manufactured is long relative to its diameter. I have found that when length is greater than diameter my process should be used for improved results.

DESCRIPTION OF THE DRAWINGS

FIG. 1b is a cross-sectional view taken approximately along line 1b—1b of FIG. 1a.

FIG. 2b is a sectional view taken along line 2b—2b of FIG. 2a.

FIG. 3b is a sectional view taken along line 3b—3b of FIG. 3a.

DESCRIPTION OF PREFERRED EMBODIMENTS

Processes

Figure 1A:
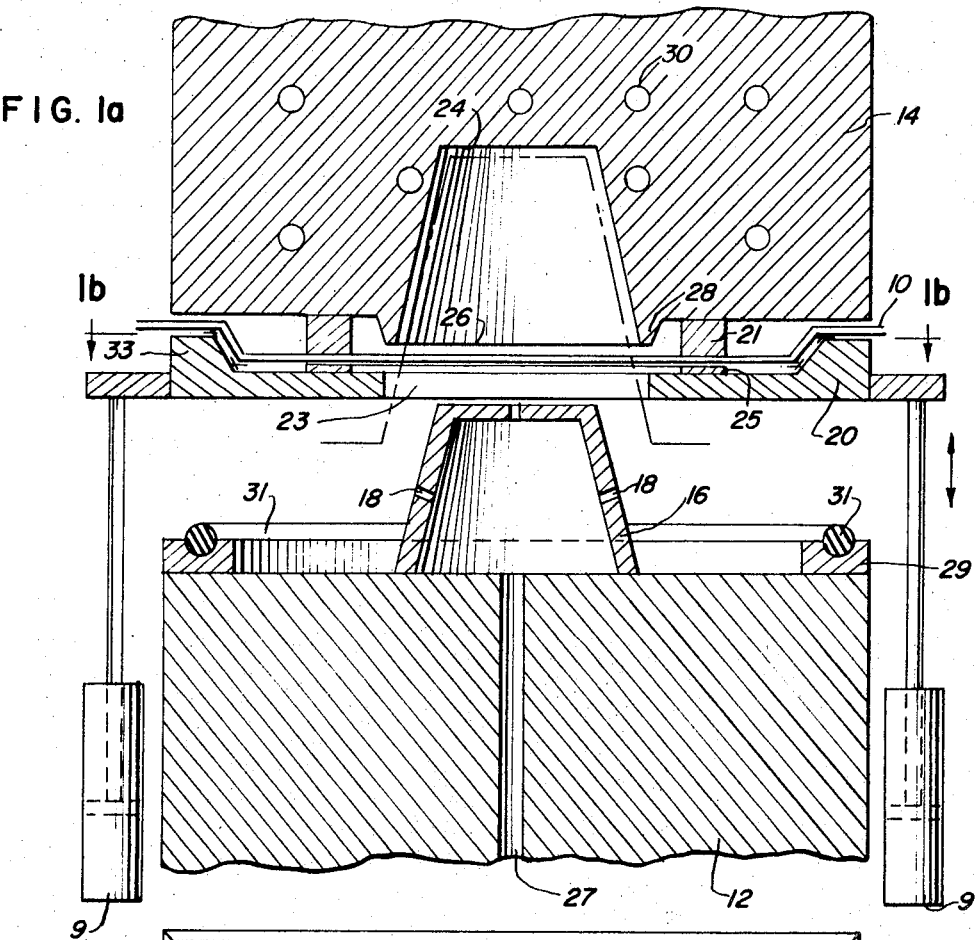
FIG. 1a is a schematic view, in cross-section, showing male and female mold sections poised to form an article of manufacture from a thin film of plastic.
Figure 1B:
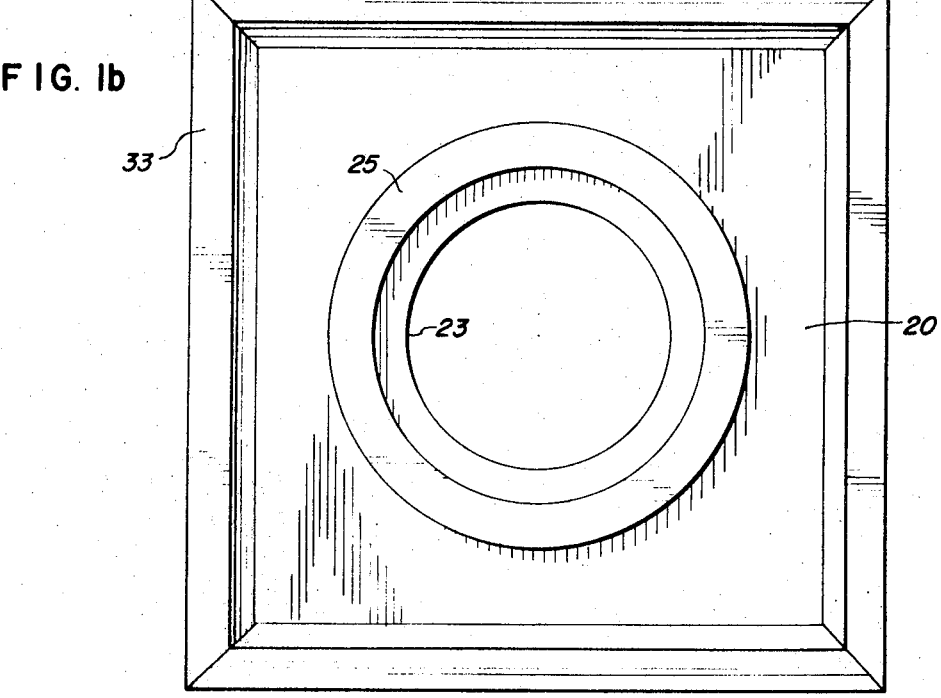

FIGS. 1a and 1b show one embodiment of my process wherein thin film 10 is clamped at the open mouth of cavity 24. This restricts the amount of film forced into the cavity. As illustrated in these figures, film 10 of heated plastic is positioned between male and female mold sections 12 and 14, respectively, of a thermoforming apparatus. Male mold section 12 includes hollow plug assist 16 having several air ports 18 and channel 27 leading to the interior of the plug assist. A rectangular seal 29 is fixed to section 12 and it includes rubber sealing gasket 31. Female member 14 includes a female mold cavity 24 with the open mouth 26 of cavity 24 being circumscribed and defined by protecting annular ridge 28. An annular clamping ring 21 circumscribes ridge 28, and it is attached to the face of mold 14. Within female section 14 are a plurality of channels 30 through which water runs to cool section 14 and dissipate the heat of film 10.

Between male and female sections 12 and 14 is novel clamping plate 20, including annular opening 23 and upwardly projecting rectangular element 33 integral with the perimeter of plate 20. Rings 21 and 25, cavity mouth 26, and opening 23 are concentric.

Plate 20 is moved up and down by pneumatic cylinders 9. When film 10 is located between sections 12 and 14, and plate 20 is moved up toward section 14, the film is clamped at two places: at its perimeter between element 33 and the face of mold section 14, and within its perimeter between rings 21 and 25. When male section 12 is moved upwardly to engage film 10, plug assist 18 forces the film into female cavity 24. Film 10 stretches and conforms to the shape of the interior of cavity 24. When section 12 reaches its maximum upper position (shown in dotted lines), seal 29 engages the underside of plate 20 and there is formed within gasket 31 an airtight enclosure. Plate 20 cooperating in conjunction with seal 29 provides a novel structure which avoids accumulation of excess plastic at the perimeter of film 10 which can interfere with later transporting and handling thereof, especially as the film moves through the trimmer.

When film 10 has been forced into cavity 24, air, under pressure, is forced through channel 27 and into the hollow interior of plug assist 16 to positively force the film against the interior of cavity 24. When the article has been formed the plug assist is removed from the interior of cavity 24 and article of manufacture is then withdrawn from between sections 12 and 14.

This thermoforming technique results in the introduction into cavity 24, in a uniform manner, only enough film needed to make the article of manufacture. Such a technique achieves uniform wall thickness and eliminates excess material at the lip of the article of manufacture. Uniform distribution of film within cavity 24 is important in order to achieve quality lip rolling of articles of manufacture such as cups.

Figure 2A:
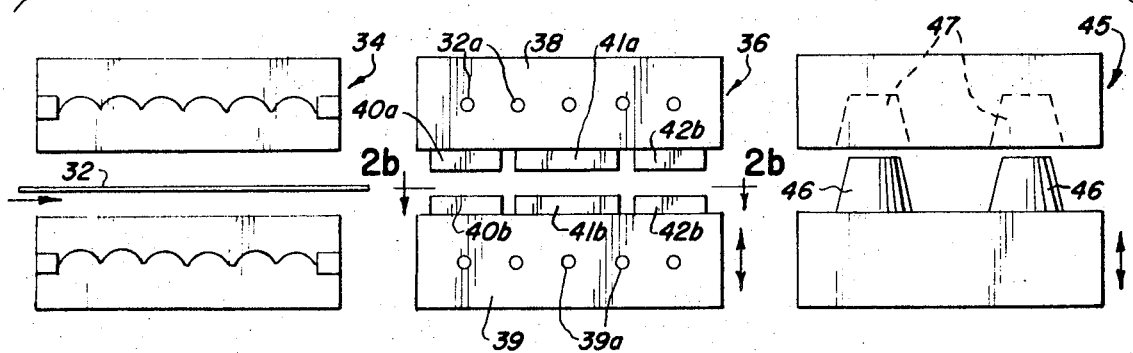
FIG. 2a schematically illustrates an alternate embodiment of my process wherein the film is uniformly heated and then selectively cooled.
Figure 2B:
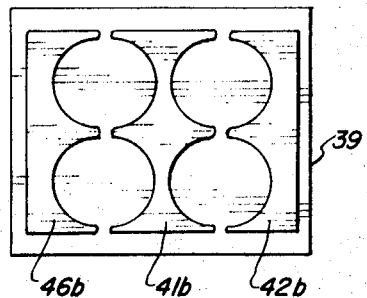
Figure 2C:
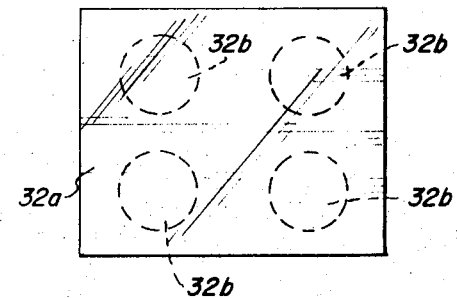
FIG. 2c is a plan view of a plastic film selectively cooled in accordance with my invention.

FIGS. 2a through 2c illustrate a second embodiment of my process wherein portions of the film not needed to properly fill the cavity are cooled. As shown in these FIGS. 2a and 2b, a film of plastic 32 is uniformly heated by heater means 34. Those portions of film 32 which should not be forced into the female cavity mold are then selectively cooled in unit 36. Unit 36 includes an upper stationary member 38 and a lower movable member 39, both of which include channels 38a and 39a, respectively, through which cooling water runs. Member 38 includes three elements 40a, 41a and 42a. Member 39 includes like-shaped elements 40b, 41b and 42b. Elements 40a–42a are directly opposite elements 40b–42b, and they are in a mirror relationship to each other. When the uniformly heated film 32 moves between members 38 and 39, member 39 moves upward to compress the film between elements 40a–42a and elements 40b–42b. This selectively cools the film so that, as shown in FIG. 2c, there are hot areas 32b shown by dotted lines, and cooled areas 32a. This selectively cooled film then moves to thermoformer 45 including male plug assists 46 and female mold cavities 47. Male plug assists 46 are moved upwardly to force the heated portions of film 32b into female mold cavities 47. Those portions of film 32b which should not be forced into cavity 32a are cool and substantially non-pliable. Thus plug assists 46 only force heated portions 32b into cavities 47.

Figure 3A:
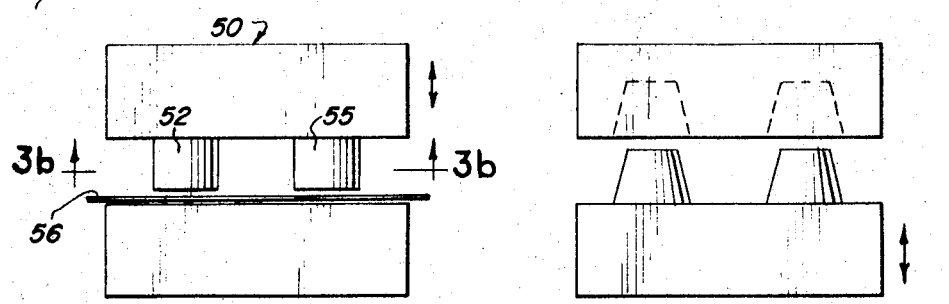
FIG. 3a schematically illustrates an alternate embodiment of my process wherein plastic film is selectively heated.
Figure 3B:
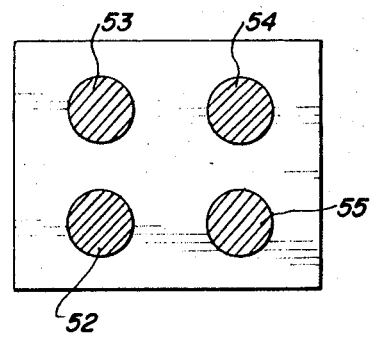
Figure 3C:
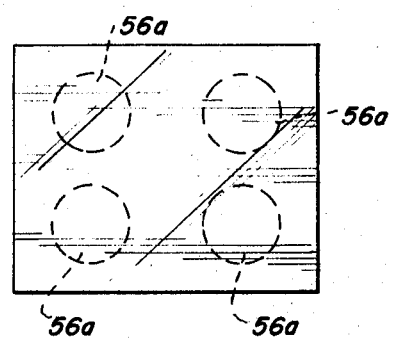
FIG. 3c is a plan view of plastic film selectively heated in accordance with my invention.

FIGS. 3a through 3c show a third embodiment of my process wherein only those portions of the film needed to properly fill a female cavity are heated. FIG. 3a shows heater 50 including four spaced cylindrical heating elements 52–55. Heater 50 is positioned over a stationary metal annular member 54 and is movable up and down with respect to this member 54. A thermoplastic film 56 is placed between elements 52 and 54 and then heater 50 is moved downwardly to bring heating elements 52–55 into momentary contact with film 56. This selectively heats film 56 as illustrated in FIG. 3c, where the areas circumscribed by dotted lines and indicated as 56a are the heated areas. This selectively heated film 56 is then moved between the female and male sections 58 and 59, respectively, of a thermoformer mold. Male section 59 is moved upwardly to force the selectively heated areas 56a of flim 56 into the female mold cavity. Only the heated areas 56a move into the mold cavity.

I claim:

1. Apparatus for making an article of manufacture from a thin film of plastic, comprising a first section including a female mold cavity therein having an open mouth circumscribed by a first clamping member spaced from and larger than the open mouth but of the same general configuration as the open mouth, and a second section including a male plug assist adapted to fit into said female mold cavity, and seal means near the perimeter of said second section, said first and second sections being adapted to move together; and movable clamping plate means disposed between said first and second sections and including an opening which permits the plug assist to pass therethrough, a second clamping member larger than the opening and having a configuration substantially the same as the configuration of the first clamping member so that the film can be clamped between said first and second members when the first and second sections move together and, at the perimeter of the plate means, a clamping element adapted to engage a thin film of plastic overlying the first section, said clamping element clamping the film near the perimeter of the first section, with the seal means engaging the underside of the clamping plate when said first and second sections are moved together.

* * * * *